UNITED STATES PATENT OFFICE.

KARL MANN, OF ZURICH, SWITZERLAND.

PROCESS FOR PRODUCING FAT AND OIL PREPARATIONS.

No. 880,316.

Specification of Letters Patent.

Patented Feb. 25, 1908.

Application filed November 24, 1905. Serial No. 288,952.

*To all whom it may concern:*

Be it known that I, KARL MANN, Ph.D., food analyst, subject of the German Emperor, residing at Zurich, Swiss Republic, 79 Feldeggstrasse, have invented certain new and useful Improvements in Processes for Producing Fat and Oil Preparations, of which the following is a specification.

This invention relates to a process for producing fat- and oil-preparations, and more especially to an improved process for the manufacture of butter substitutes such as margarin (oleomargarin) and the like, with the object of imparting to such products a greater resemblance to natural butter.

It is well known that "kephir" (kefyr), that is milk fermented with the kephir ferment, is used in the manufacture of preparations resembling butter such as margarin and the like. The process has hitherto been carried out by mixing the kephir milk with the fats and after leaving it to act on the latter for a certain length of time removing it from the solidified margarin or like residual product in a suitable manner. The margarin or the like treated in this way acquires thereby a flavor resembling butter. Endeavors have been made to more completely impart to the mixed fats all the aromatic constituents developed in the kephir by fermentation, this being done by running in the separately fermented kephir milk underneath the fat in closed vessels so that no loss of aroma should be sustained. Experiments of the inventor however have shown that far better results are obtained when milk either natural or artificial or some like product is mixed with the fats in question in a suitable manner such as by emulsification after which fermentation is induced in the emulsified mixture by the addition of the kephir ferment.

A convenient method of carrying out this improved process is described in the following example the proportions of the various ingredients being given by weight. About 100 parts of melted margarin are introduced with 50 to 100 parts of milk into a vessel capable of being closed, and both ingredients are then intimately mixed by suitable means to form a homogeneous mass similar to cream or mayonnaise. In order to obtain the desired color or other special properties, such for instance as the characteristic flavor ac-
quired by butter when the cows are fed on green fodder, additions of suitable coloring matters, vegetables or extracts from substances of vegetable or animal origin, may be added. I may use for instance the extracts from green fodder, from meadow-grass and herbs, and substances of animal origin for example lecithin, pepsin, trypsin, gall, pancreatic gland, rennet-bag, extracts of meat, substances of the brain, nerve-substances, and similar substances. The total mixture is then caused to ferment by the introduction of the kephir ferment fungus or kephir milk, care being taken (by regulating the temperature and by suitable movement) to maintain the intimacy of the mixture throughout the fermenting process so as to prevent the milk and fat from separating. The result attained by this means is that the aromatic constituents devoloped by the fermentation are completely absorbed by the fat, owing to its extremely fine state of division, and at the same time the specific fatty odor of the raw material is favorably affected or disappears entirely. When fermentation is completed the fat is freed as completely as possible from the fermented milk, by washing the mixture or by centrifugating it in a molten condition, and freed from water, and the resulting product resembling butter is kneaded thoroughly, salt being added if desired. In this way a preparation is obtained which possesses the true butter flavor, browns when roasted and at the same time gives off the characteristic odor of natural butter. By using fats and milk or the like that have been sterilized beforehand by heat, and by taking care that all injurious micro-organisms are excluded during the fermentation and subsequent treatment, a butter substitute is obtained, which is free from pathogenic germs and micro-organisms, and thereby possesses great advantages over even natural butter.

Other animal and vegetable raw fats and oils, and mixtures of same, can be treated in a similar manner to margarin or can be converted into fats and oils for food purposes.

In place of cow's milk, the milk of other animals, as well as artificial milk, solutions of milk sugar, milk of almonds, cocoanut milk, or analogous preparations from other products of vegetable or animal origin may be utilized, and also juices, extracts or solid products of vegetable origin or various mixtures of the aforesaid materials, so far as they are capable of in any way imparting butter-like properties to the fat mixture, or of favorably influencing the flavor or smell and capable of serving as a fostering medium for kephir ferments.

Instead of kephir ferment fungus use may be made, for the fermentation, of other kephir-like substances as are capable of exerting a fermentative action similar to kephir fermentation or of extracts produced from the named substances or ferments.

The so-called kephir ferment fungi are composed of a fairly large number of ferments not living in symbiose and which are capable of producing lactic acid, alcohol, peptone, as well as other substances of a specific taste and odor. When certain different fungi or ferments not living in symbiose, but as independent individuals, are combined in a suitable manner, the result of their biochemical action is analogous to that of kephir ferment fungi, the kephir-like ferments producing the same effect as the mixture of fungi commonly called kephir ferment.

Having now particularly described and ascertained the nature of my said invention and in what manner the same is to be performed I declare that what I claim is:—

1. A process for producing fat- and oil-preparations, consisting in mixing fat substances with a fostering medium for "kephir", in impregnating the mixture with "kephir", in causing it to ferment at a temperature favorable to the development of the ferment and in agitating the fermenting mass.

2. A process for producing fat- and oil-preparations, consisting in mixing fat substances with a fostering medium for kephir ferments, in impregnating the mixture with kephir-like acting ferments and in causing it to ferment by agitating the mass at a temperature favorable to the development of the ferments.

3. A process for producing fat- and oil-preparations, consisting in mixing fat substances with a fostering medium for kephir, in impregnating the mixture with kephir ferment, in causing it to ferment by agitating the mass at a temperature favorable to the development of the ferment and in separating the obtained fat preparation from the by-products of the fermentation.

4. A process for producing butter substitutes, consisting in mixing butter like fats with a fostering medium for "kephir", in impregnating the mixture obtained with kephir, and in causing the mass to ferment by agitating it at a regulated temperature favorable to the development of the ferment.

5. A process for producing butter substitutes, consisting in mixing butter fats with a fostering medium for "kephir", in impregnating the mixture obtained with kephir, and in causing the mass to ferment by agitating it at a regulated temperature favorable to the development of the ferments and in separating the obtained fat preparation from the by-products of the fermentation.

6. A process for producing butter substitutes, consisting in mixing butter like fats with milk, in impregnating the mixture obtained with kephir, and in causing the mass to ferment by agitating it at a regulated temperature favorable to the development of the ferment and in separating the obtained fat preparation from the by-products of the fermentation.

7. A process for producing butter substitutes, consisting in mixing butter like fats with milk-substitutes, in impregnating the mixture obtained with kephir, and in causing the mass to ferment by agitating it at a regulated temperature favorable to the development of the ferment and in separating the obtained fat preparation from the byproducts of the fermentation.

8. A process for producing butter substitutes, consisting in mixing butter like fats with a solution of milk sugar, in impregnating the mixture obtained with kephir, and in causing the mass to ferment by agitating it at a regulated temperature favorable to the development of the ferment and in separating the obtained fat preparation from the by-products of the fermentation.

9. A process for producing butter substitutes, consisting in mixing butter like fats with a fostering medium for kephir, in adding to the mixture products of vegetable origin capable of imparting in any way butter-like properties to the fat mixture, in impregnating it with "kephir", in causing the mass to ferment by agitating it at a regulated temperature favorable to the development of the ferment and in separating the obtained fat preparation from the by-products of the fermentation.

10. A process for producing butter substitutes, consisting in mixing butter like fats with a fostering medium for kephir, in adding to the mixture products of animal origin capable of imparting in any way butter-like properties to the fat mixture, in impregnating it with "kephir", in causing the mass to ferment by agitating it at a regulated temperature favorable to the development of the ferment and in separating the obtained fat preparation from the byproducts of the fermentation.

11. A process for producing butter substitutes, consisting in mixing butter like fats with a fostering medium for kephir, in adding to the mixture products of animal origin capable of imparting in any way butter-like properties to the fat mixture, in impregnating the mixture obtained with a ferment produced from kephir, in causing the mass to ferment by agitating it at a regulated temperature favorable to the development of the ferment and in separating the obtained fat preparation from the byproducts of the fermentation.

In testimony whereof I have hereunto set my hand in presence of two subscribing witnesses.

KARL MANN.

Witnesses:
EUG. BRASCHLER,
A. LIEBERKNECHT.